United States Patent [19]

Urabe

[11] 4,442,725
[45] Apr. 17, 1984

[54] SHOCK ABSORBING APPARATUS FOR TRAVELLING A TABLE OR TOOL REST IN MACHINE TOOLS

[75] Inventor: Hirokuni Urabe, Fukuyama, Japan

[73] Assignee: Shigiya Machinery Works, Ltd., Japan

[21] Appl. No.: 266,765

[22] Filed: May 26, 1981

[51] Int. Cl.³ .............................................. F16H 1/08
[52] U.S. Cl. .............................. 74/89.15; 74/424.8 R; 74/841
[58] Field of Search ............... 74/89.15, 424.8 R, 411, 74/841; 82/21 R, 27

[56] References Cited

U.S. PATENT DOCUMENTS

| | | | |
|---|---|---|---|
| 2,368,408 | 1/1945 | Brooking | 74/424.8 R |
| 2,679,168 | 5/1954 | Rokos | 74/441 |
| 3,733,940 | 5/1973 | Harman et al. | 74/424.8 R |

*Primary Examiner*—Ernest R. Purser
*Attorney, Agent, or Firm*—William A. Drucker

[57] ABSTRACT

The present invention mainly relates to a shock absorbing apparatus for travelling a table or tool rest in machine tools such as a grinding machine, a lathe, a milling machine, a planer, and a drilling machine, wherein staged notch section is formed at both a feed nut travelling in engagement with a feed screw shaft of a table or a tool rest and an engaging bracket placed below said table or said tool rest or a bushing member fixed together with said engaging bracket a sliding collar having a notched section in order to engage with said corresponding notch section is located between said feed nut and said engaging bracket or said bushing member, one end of said sliding collar is formed as to be projected from the outer extreme end of the same side of said feed nut in order to make it possible that a spring receiver is mounted, thereby causing a hollow section to be formed between said sliding collar itself and the extreme end of said feed nut at the same side, and the other end of said sliding collar is so formed that said other end may be located inwardly of the outer extreme end of said engaging bracket or said bushing member at the same side, another spring receiver is mounted at the outer end section of said engaging bracket or said bushing member at the same side, thereby causing a hollow section to be formed at the same side of said sliding collar, both hollow sections are provided with an elastic member (e.g. a spring) with being sprung or widened, thereby causing shock produced by unusual collision to be effectively absorbed.

4 Claims, 2 Drawing Figures

SHOCK ABSORBING APPARATUS FOR TRAVELLING A TABLE OR TOOL REST IN MACHINE TOOLS

BACKGROUND OF THE PRESENT INVENTION

In such a machine tool as a surface or cylindrical grinding machine, a lathe, a milling machine, a planer, or a drilling machine, troubles like injury or breakage of a tool, a wheel or cutter sometimes occur due to unusual collision of said tool, wheel or cutter against a workpiece during machining or grinding work.

Up to now, no measure has been provided to absorb shock produced by above unusual collision because a feed nut travelling in engagement with a feed screw shaft is merely directly mounted at a bracket located at the rearside of a sliding table or a tool rest in these machine tools.

OBJECTS OF THE PRESENT INVENTION

Therefore, one of the primary objects of the prevent invention is to propose a shock-absorbing apparatus to solve such troubles as described hereinabove. Still another object of the present invention is to ensure that no error of the feed accuracy during machining is secured. These and further objects of the present invention will be made clearer through reading the following description in reference with the attached drawings.

BRIEF DESCRIPTION OF THE ATTACHED DRAWINGS

DESCRIPTION OF THE PREFERRED EMBODIMENT

Figure 1:
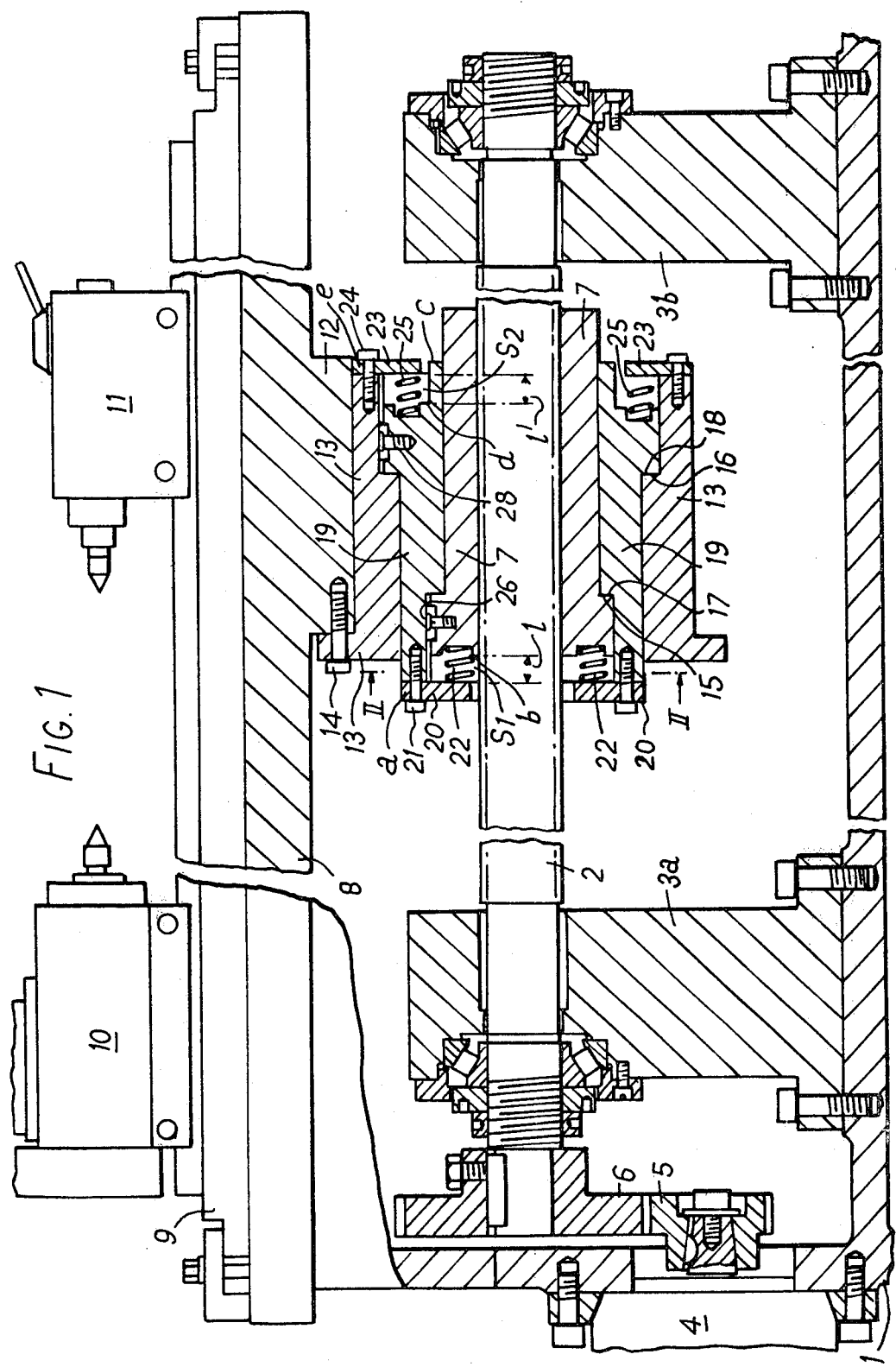
FIG. 1 is an elevational views partly in section of principal parts of an embodiment disclosed by the present invention.
Figure 2:
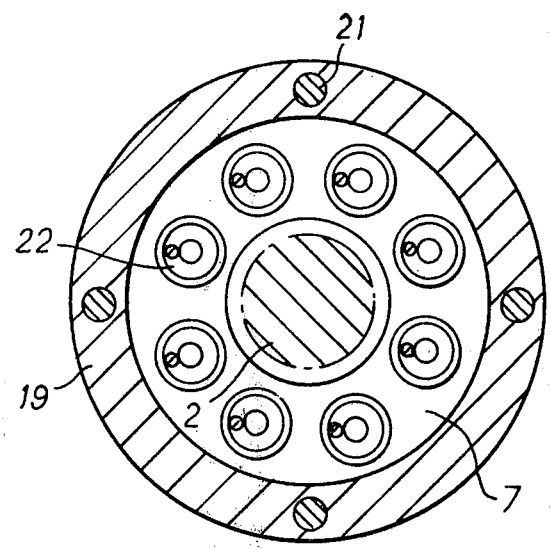
FIG. 2 is a view taken along the line II—II of FIG. 1.

A bed is indicated at 1 and a feed screw shaft 2 is rotatably supported in said bed 1 by means of bearing brackets 3a and 3b. 4 designates a DC servo motor installed at a side of said bed. Said DC servo motor 4 rotates said feed screw shaft 2 in either clockwise or counterclockwise direction by way of gears 5 and 6. A feed nut 7 travels in engagement with said feed screw shaft 2. And 8 designates a sliding table on which a worktable 9 is fixed. A spindle head 10 and a tailstock 11 are also placed on said worktable 9, respectively. An engaging bracket formed at the rear side of said sliding table 8 is indicated at 12. A bushing 13 is fixed to said engaging bracket 12 with set screws 14.

In this shock absorbing apparatus, a staged notch 15 (at the side of said feed nut 7) and another staged notch 16 (at the side of said bushing 13) are formed at either side of travelling direction, as shown in the illustrated embodiment, in engagement with said feed nut 7, said engaging bracket 12 and said bushing 13 (the illustrated embodiment shows that a bushing member 13 is used). A sliding collar 19 which is also provided with staged notches 17 and 18 similar to said notches 15 and 16 so that said notches 17 and 18 may be engaged therewith is placed between said bushing 13 and said feed nut 7.

At this time, said notch 17 is then confronted to said notch 15 of said feed nut 7 and is engaged therewith. Said notch 18 is then confronted to said notch 16 of said bushing 13 and is engaged therewith. On the other hand, the forward extreme edge "a" of said sliding collar 19 is formed so as to be projected by a certain fixed distance "L" from the forward edge "b" of said feed nut 7 and a spring receiver 20 is fixedly mounted with a set screw 21 toward said feed screw shaft 2, causing an empty chamber S, to be formed between said spring receiver 20 and said forward end of said feed nut 7. Accordingly, an elastic member i.e. a spring 22 in the illustrated embodiment, is mounted in said empty chamber S, as being sprang or widened.

On the other hand, the rear edge part "c" of said sliding collar 19 is formed to be L-shaped and the vertical stage "d" of said L-shaped part is so formed as to be located by a certain fixed distance "L'" inwardly of the rear edge "e" of said bushing 13. Besides, a spring receiver 23 is fixedly placed with set screw 24 toward said sliding collar at said rear edge of said bushing 13, thereby causing another empty chamber "$S_2$" to be formed between said vertical stage "d" and said spring receiver 23. And another spring 25 is placed, as being sprang or widened, in said empty chanber "$S_2$" as well as in said empty chamber "$S_1$".

Provided is a means to prevent the rotation accompanied with that of said feed screw shaft among said feet nut 7, said sliding collar 19 and said bushing 13. Namely, as shown in the attached drawings of this embodiment, a key 26 fixed to said feed nut 7 and engaged in a key groove of said sliding collar 19 and another key 28 fixed to said sliding collar 19 and engaged in another key groove of said bushing 13 are provided completely to prevent the accompanied rotation among them.

Now, the following description deals with the actual operations of this shock-absorbing apparatus disclosed by the present invention. As said feed screw shaft 2 rotates in either normal or reverse direction together with the drive of said DC servo motor 4, said feed nut 7 which is in engagement with said feed screw shaft 2 shafts or travels in the right or left direction. At this time, said sliding table 8 and said engaging bracket 12 accordingly travels by means of said sliding collar 19 and said bushing 13 in the same direction as said feed nut 7 does, causing a feed necessary for said sliding table 8 to be effected. To speak in details, the travel in the direction marked by the arrow "g" forces said staged notch 15 of said feed nut 7 to be engaged with said notch 17 of said sliding collar 19, causing said collar 19 to travel in the same direction as above. Besides the travel in the direction marked by the arrow "f" forces said staged notch 18 of said sliding collar 19 to be engaged with said notch 16 of said engaging bracket 12, causing said collar 19 to travel in the same direction as above.

In the above operations, said staged notches 15 and 17 or 16 and 18 are in pressing contact with respective spring 22 and 24 by a their springing action. However, both springs 22 and 24 are so strong that mutually mating engagement may not be influenced in any usual feedrate by their springing action. The strength of these springs will be determined according to a specified use, eg. a kind of machine tool or a tool and the other practical use conditions.

Therefore, the rotation of said feed screw shaft is transmitted without fail to said sliding table 8 through said staged notches 15 and 17 or 16 and 18 during machining work. Besides, no problem nor trouble for use of the shock-absorbing apparatus of the present invention is secured. If a grinding wheel or a tool should come in unusual collision against any projected part of a workpiece, said springs 24 and 25, respectively, can absorb the collision force, thereby causing injury or breakage of a tool or workpiece to be effectively prevented.

The above embodiment shows the case of a grinding machine where a bushing 13 is used. For the other machine tools such as a lathe, a milling machine, a planer and/or a drilling machine, the shock-absorbing apparatus of the present invention can be embodied as well as the above griding machine, and it is possible to mount any other type of spring receiver 23 and notch 16, which is provided at said bushing 13 in the above embodiment, directly at the engaging bracket 12 to save said bushing 13. Besides, a spring can be replaced for disc spring instead of coil spring and it is free to change or to add some other alterations to the shape of said empty chamber "L" or "L'".

I claim:

1. A shock-absorbing apparatus for sliding tables in machine tools, the table having a feed nut and a feed screw and being adapted to be moved by said feed nut mounted on said feed screw, comprising:
   (a) a rigid bracket disposed on said feed screw,
   (b) a sliding collar disposed on said rigid bracket,
   (c) a bushing disposed on said sliding collar,
   (d) opposing staged notches on one of the rigid bracket and sliding collar or on the sliding collar and bushing, and further comprising:
   (e) means for pressing the opposing staged notches of two adjacent parts against one another and thus prebiasing the parts against one another, characterized in that:
   (f) said feed nut (7) serves as said rigid bracket,
   (g) a table (8) in engagement with said bushing (13) adapted to be moved by rotating said feed screw (2); and
   (h) a tongue and groove configuration between one of said feed nut (7) and sliding collar (10) or between the sliding collar (19) and bushing (13) to prevent rotational movement of these parts.

2. The apparatus according to claim 1 wherein the elastic element is one of a disc spring or a coil spring (22, 25).

3. The apparatus according to claim 1 wherein one end of said sliding collar (19) projects beyond the outer extreme on the same side of said feed nut (7) and has a tongue-receiving part (20), thereby forming a chamber ($S_1$) between said sliding collar and feed nut on the same side, the other end of said sliding collar (19) being located inwardly of the outer extreme of the bushing (13) on the same side, another tongue-receiving part (23) mounted at the outer extreme of said bushing, thereby forming a chamber ($S_2$) on the same side of said sliding collar, and an elastic spring element (22, 25) disposed in both chambers ($S_1$, $S_2$).

4. The apparatus according to claim 3 wherein the elastic element is one of a disc spring or a coil spring (22, 25).

* * * * *